United States Patent [19]

Siegrist

[11] Patent Number: 4,563,939
[45] Date of Patent: Jan. 14, 1986

[54] HYDROSTATIC OR PNEUMATIC DRIVE AND METHOD OF OPERATING SAME

[75] Inventor: Ronald Siegrist, Oberuzwil, Switzerland

[73] Assignee: Vickers, Incorporated, Troy, Mich.

[21] Appl. No.: 502,524

[22] Filed: Jun. 9, 1983

[30] Foreign Application Priority Data

Jun. 11, 1982 [DE] Fed. Rep. of Germany ....... 3222008

[51] Int. Cl.[4] ...................... F01L 25/08; F15B 13/16; H03K 4/08
[52] U.S. Cl. ...................................... 91/275; 91/459; 137/596.17
[58] Field of Search ............... 91/459, 275, 361; 251/133; 137/596.17; 307/228, 519

[56] References Cited

U.S. PATENT DOCUMENTS

| 3,385,169 | 5/1968 | Hale et al. | 91/459 |
| 3,768,373 | 10/1973 | Divigard | 91/459 X |
| 4,262,784 | 4/1981 | Sibeud | 91/459 X |
| 4,481,768 | 11/1984 | Goshorn et al. | 91/361 X |

FOREIGN PATENT DOCUMENTS 2808694 9/1979 Fed. Rep. of Germany.
2902264 7/1980 Fed. Rep. of Germany.
2299103 8/1976 France.

OTHER PUBLICATIONS

Kelly, R. E., "Up-Down Ramp Quickens Servo System Response", vol. 51, No. 15, Jul. 20, 1978, *Electronics.*

*Primary Examiner*—Robert E. Garrett
*Assistant Examiner*—George Kapsalas
*Attorney, Agent, or Firm*—Barnes, Kisselle, Raisch, Choate, Whittemore & Hulbert

[57] ABSTRACT

A hydrostatic or pneumatic drive for driving a mass to be accelerated and decelerated, such as in a die casting or injection moulding machine, has a controllable valve arrangement which is operable to vary the fluid flow rate therethrough. The fluid flow rate is controlled by a reference value control generator operable to produce a ramp having superimposed thereon further control pulses. Such control pulses are a positive control pulse at the beginning of the rising slope and at the end of the falling slope of the ramp and a negative control pulse at the end of the rising slope and at the beginning of the falling slope of the ramp. Each control pulse has a volume which corresponds to a so-called compression volume factor which reflects the compressibility of the fluid used in the drive and also of the elasticity of ducts which expand by fluid pressure.

19 Claims, 4 Drawing Figures

HYDROSTATIC OR PNEUMATIC DRIVE AND METHOD OF OPERATING SAME

BACKGROUND OF THE INVENTION

The present invention relates to a method of operating a hydrostatic or pneumatic drive for a mass which is to be accelerated and decelerated, and also to such a hydrostatic or pneumatic drive.

In a drive of that kind, the drive arrangement includes a motor such as a linear or rotary motor, a fluid pressure source for supplying a hydraulic or pneumatic pressure fluid, and a valve arrangement. The valve arrangement has a restricted passageway which can be controlled in order to produce a variable working flow which is subject to fluctuating working pressures, thereby giving a compression volume in respect to the pressure fluid, relative to an initial condition of the arrangement depending on the working pressure. The arrangement also includes a reference value control generator for controlling the valve arrangement.

DE-A-specification No. 2 902 264 discloses a control device for a hydraulic installation, wherein defined acceleration or retardation of the drive arrangement can be produced by a defined increase or decrease in the flow of pressure fluid. That arrangement includes various electronic control means, for avoiding sudden jerks in acceleration. More specifically, disposed between the pump and the motor of the arrangement is a four-way directional valve having three operative positions, the valve being electrically operable, with ramp generating means being included in the electrical control arrangement. The output signal of the ramp generating means is applied to an electrical switching amplifier which is then operative to control the directional control valve. That arrangement does not include any provision for making allowances for the fact that the hydraulic fluid is compressible and that the components of the drive arrangement are caused to expand upon an increase in pressure.

DE-A-specification No. 28 08 694 discloses another positioning means for a hydraulic drive, which seeks to avoid a sudden change in speed of the drive. For that reason, a ramp generating means is disposed between a reference value control generator and an actual value detector means on the one hand, and an electrically actuable hydraulic control member on the other hand. This arrangement also takes no account of the compression volume of the system.

In regard to injection moulding machines. FR-A-specification No. 22 99 103 discloses that an injection moulding mould is to be filled more slowly, towards the end of the filling stroke movement of the system, because otherwise there would be a pressure peak. Therefore, before the mould is in the completely filled condition, the speed of the injection piston of the injection moulding machine is reduced thereby also to reduce the speed of filling of the mould, as it approaches the completely filled state.

Still dealing with die casting and injection moulding machines, it will be appreciated that a mass which is at rest or which is being moved is to be driven by means of a piston cylinder unit as the motor of the drive so that the mass can be caused to move at a given speed. For that purpose, the valve arrangement is opened to a gradually increasing extent, in order thereby to apply an increasing pressure to the piston which is operative to drive the mass in question. As referred to above however, the hydraulic fluid is not incompressible, while the components of the drive may also tend to suffer from an expansion or swelling effect, more particularly the hydraulic lines of the arrangement, with the result that a certain proportion of the flow of hydraulic fluid supplied to the system is absorbed in a capacitive-like manner by the drive system, and does not directly result in displacement of the mass to be driven by the drive system. It will be seen furthermore that the capacitively absorbed pressure fluid represents a stressed spring which, with the mass to be moved, represents an oscillatory system. The stimulus for oscillation of that system increases in proportion to the rate at which the drive arrangement and the mass connected thereto are to be brought up to the desired speed of movement. Therefore, when the electrical control arrangement has the above-mentioned reference value control generator for controlling the operation of the drive, if the generator produces a steep ramp voltage, the system responds to that mode of operation with weakly damped oscillations; in other words, the pressure only gradually settles down to a desired reference value, with the result that the piston of the drive arrangement only gradually attains the desired, steady speed. In practice therefore, a ramp voltage having a ramp time in the order of magnitude of 400 ms is used. In this respect, experts were of the opinion that the cycle time of injection moulding machines, which involves such ramp times cannot be reduced to any substantial extent (see 'Microelectronics in Injection Molding Machines' by Dr. W. Elbe and R. K. Jackson, from Mannesmann-Demag and Mannesmann-Demag-Hamilton, in particular page 4 thereof).

SUMMARY OF THE INVENTION

An object of the present invention is to improve the dynamics of a hydrostatic or pneumatic drive arrangement, in an effort to shorten the machine cycle time and/or to reduce the loadings on the machine.

Another object of the invention is to provide a mode of operating a hydrostatic or pneumatic drive arrangement, which can achieve savings in drive energy.

According to the present invention, there is provided a method of operating a pressure fluid drive for driving a mass to be accelerated and decelerated, which includes a pressure fluid actuator motor means, a pressure fluid source, and a valve means having a controllable flow opening for producing a variable working flow which is subject to a fluctuating working pressure, thereby resulting in a compression volume in respect of the pressure fluid relative to an initial or rest condition depending on the working pressure, wherein the overall change in the working flow from an initial value to a final adjusted value is effected by the following steps:

(a) from an initial value, the working flow is abruptly increased or decreased, depending on the sign of the overall change of that working flow (positive sign=increasing flow, negative sign=decreasing flow);

(b) in a middle flow range, there is a gradual change in the working flow, just in accordance with said sign of the overall change; and (c) when the working flow approaches the final value, the flow is abruptly decreased or increased respectively, depending on said sign of the overall change of the working flow; said flow increase or decrease having an amount which is made to depend from said compression volume.

The present invention also provides a pressure fluid drive for driving a mass to be accelerated and decelerated, which comprises: a pressure fluid actuated motor means; a pressure fluid source; a valve means having a controllable flow opening for producing a variable working fluid flow which is subjected to a fluctuating working pressure and therefore to compression which can be measured as a compression volume; a reference value control generator means operable to produce a ramp voltage having a positive control pulse superimposed thereon at the beginning of the slope, if the ramp is rising, and at the end of the slope, if the ramp is falling, and a negative control pulse superimposed thereon at the end of the slope, if the ramp is rising and at the beginning of the slope, if the ramp is falling, the magnitude of each the positive and negative control pulses depending on the respective said compression volume.

A method and arrangement according to the present invention will now be described by way of example with reference to the accompanying drawings in which:

DESCRIPTION OF THE PREFERRED EMBODIMENTS

Figure 1:
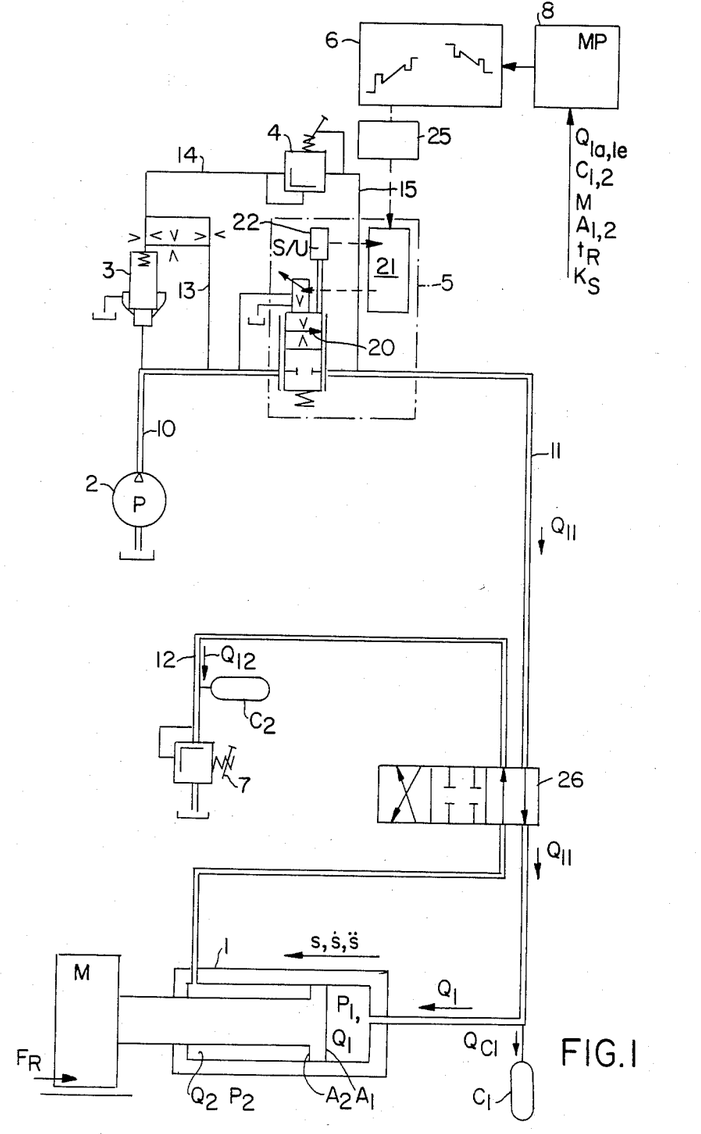
FIG. 1 is a diagrammatic view of a drive according to the invention.

Referring now to the drawings and more particularly to FIG. 1 thereof, the main components of the illustrated drive arrangement are a motor means in the form of a piston cylinder unit 1, as a hydrostatic or displacement motor, a pump 2 and an associated relieving pressure regulator valve 3, constituting a hydraulic pressure source, a valve 4 for maintaining a constant pressure difference, an electrically actuable valve arrangement 5 and a reference value control generator 6. The reference value control generator 6, for producing a reference or desired value, may include a pulse generator for generating positive pulses, a pulse generator for generating negative pulses, and a ramp generator, the values of which are adjustable from the outside of the arrangement, as will be described in greater detail hereinafter. It will be appreciated that, although the illustrated arrangement has a linear motor means in the form of the piston cylinder unit 1, the drive could alternatively include a rotary motor means, and similarly, instead of being operated with hydraulic fluid, could be operated pneumatically.

Referring still to FIG. 1, connected to the outlet port of the piston cylinder unit 1 is an outlet valve 7 for controlling the return of fluid from the unit 1. It will be appreciated that, in order to protect the system, pressure relief valves of conventional type may be connected thereto, although such valves are not illustrated in the drawings. Likewise, the system could include a further pump with accessory valves for a higher level of hydraulic flow consumption.

The pump 2 discharges hydraulic fluid in a pump line 10 which connects to the input side of the valve arrangement 5 and is then continued therefrom in the form of a feed line 11 to the piston cylinder unit 1. A return line 12 transfers fluid back to tank. A directional valve 26 is included in lines 11 and 12 and has three positions, a first center closed position in which the lines 11,12 are shut off, a second position for forward movement of the cylinder piston, and a third position for the reverse movement of the piston. The pressure which is built up in the pump line 10 by way of the pump 2 is applied through a control line 13 and a series of restrictors to the control chamber of the valve 3, that side of the valve 3 also being connected to the valve 4 by way of a further control line 14. Another control line 15 provides a connection to the feed line 11. By virtue of that arrangement, the valve 4 is operated by the pressure difference or drop at the valve arrangement 5, between the lines 10 and 11. If that pressure drop exceeds a given value of for example 2 bars, the valve 4 opens and provides for adjustment of the control pressure at the valve 3. The valve 3 endeavours to maintain the adjusted pressure differential of two bars, that is to say, if the pressure in the line 10 becomes more than 2 bars higher than the pressure in the line 11, the valve 3 operates and suitably relieves the pressure in the line 10. That system therefore provides for a constant pressure drop at the valve arrangement 5.

The valve arrangement 5 represents a system which is referred to as a proportional restrictor means, that is to say, the width of a restrictor passageway 20 therein is proportionally dependent on the magnitude of the reference value control voltage U which is supplied thereto from the reference value control generator 6, once a certain start-up time has elapsed. More particularly, for that purpose, the arrangement includes a reference value-actual value comparison means 21 for comparing the reference value U supplied by the control generator 6, to the actual value corresponding to the actual width of the restricted passageway 20. The actual width is detected by means of a travel detector unit 22 providing the actual value. The system is adjusted until the actual value and the reference value are the same. In practice, the restricted passageway 20 is formed by a main valve which is controlled by a pilot valve, that being an arrangement with which the man skilled in the art will generally be familiar so that a detailed description thereof is not required herein.

As soon as the restricted passageway 20 is increasingly opened by supplying control voltage U to the valve arrangement 5, the pressure in the line 11 increases and the piston in unit 1 begins to move. When that happens however, it is not only the cylinder chamber in the piston cylinder unit 1 that increases in size, in accordance with the supply flow $Q_1$ of hydraulic fluid to the unit 1, but in addition, as the pressure increases, the compressibility of the hydraulic fluid and expansion of the components in the drive arrangement make themselves felt. A hydraulic capacitance $C_1$ is, so to speak, filled by the hydraulic fluid flow $Q_{C1}$ which is taken from the hydraulic fluid flow $Q_{11}$ in line 11. The volume of hydraulic fluid which is absorbed in that way by the hydraulic capacitance $C_1$ is referred to, in this specification, as the compression volume and is denoted by $V_k$. The hydraulic capacitance $C_1$ furthermore represents an energy storage means, in the sense of being equivalent in mechanical terms to a stressed spring, so that, in conjunction with the mass M which is to be driven by the arrangement, the result is an oscillatory system. Although such an oscillatory system can be damped by a braking means as the outlet valve 7 for controlling the return flow $Q_{12}$, a second oscillatory system is created by a hydraulic capacitance indicated at $C_2$ and the pressure G in the return line 12.

Figure 2:
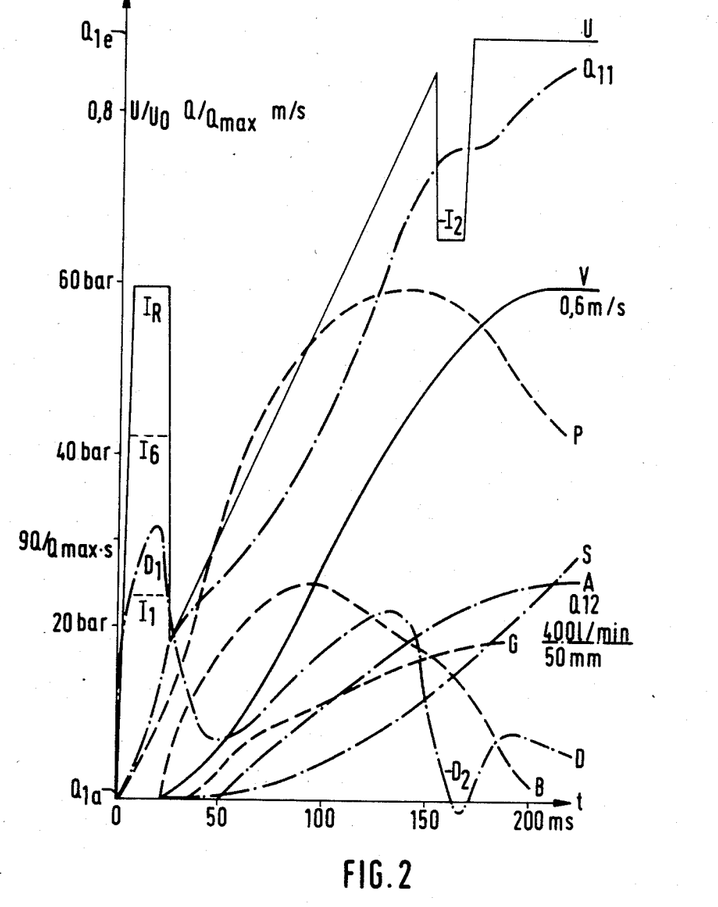
FIG. 2 is a graph showing transient stages of a control voltage U, a working flow $Q_{11}$, the time derivative D of the working flow, a feed pressure P, a return flow $Q_{12}$, an associated counter-pressure G, displacement S, speed V and acceleration B of a mass, all in respect of time in ms.
Figure 3:
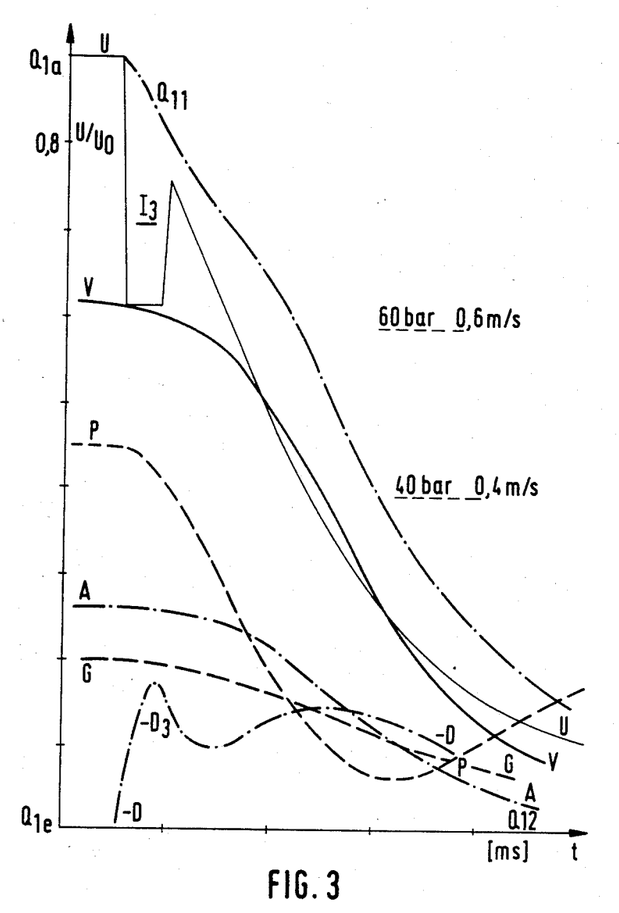
FIG. 3 shows a further graph showing transient stages of a control voltage U, a working flow $Q_{11}$, a feed pressure P, a return flow $Q_{12}$, the associated counter-pressure G, displacement S, the speed V and acceleration of a mass, all in respect of time t in ms.

Surprisingly, it has been found that the stimulus to oscillation of the system can be at least substantially reduced or avoided by the reference value control voltage U being of the configuration shown in FIGS. 2 and 3 respectively, to which reference will therefore now be made.

As mentioned above, the reference value voltage generator 6 may include two pulse generators, for generating positive and negative pulses respectively, and also a ramp generator which, so-to-speak, supplies the reference voltage for the pulse generators. The pulse width and the pulse height of the pulses produced by the pulse generators, and also the slope and the height of the ramp characteristic produced by the ramp generator, can be adjusted. When the system is subject to fluctuating requirements as is the case for example in die casting machines and injection moulding machines, the arrangement may include, as illustrated, a microprocessor 8 for suitably controlling the pulse generators and the ramp generator. As will be described below, the microprocessor may receive parameters relating to the hydraulic flow $Q_{1a}$ and $Q_{1e}$ at the beginning and at the end of the ramp characteristic, the hydraulic capacitances $C_1$ and $C_2$, the mass M to be driven by the drive arrangement, the surface areas $A_1$ and $A_2$ of the piston cylinder unit 1 and the ramp time $t_R$ and slope $K_s$ of the ramp voltage as diagrammatically indicated in FIG. 1.

By virtue of that arrangement, the physical characteristics which determine the above-defined compression volume $V_k$ can be precisely taken into account, for each situation of use. It is also possible to determine whether additional pulses, indicated by $I_G$ and $I_R$ which will be described hereinafter and which are indicated in FIG. 2 are to be applied or whether the superimposition of a pulse is to be entirely omitted, as is the case for example when the arrangement is to be brought to a halt or when a die or mould is closed. It will in fact be seen hereinafter that, when the mass M is to be slowed down to zero speed, the positive control pulse is no longer superimposed on the ramp voltage at the end of its fall.

Referring now more specifically to FIG. 2, shown therein is a time-dependent voltage in the form generally of a ramp characteristic U. However, superimposed on the ramp voltage at the beginning of the slope is a positive control pulse indicated at $I_1$, while superimposed on the ramp voltage at the end of the slope configuration is a negative control pulse indicated at $-I_2$. The magnitude of the positive and negative control pulses $I_1$ and $-I_2$ depends on the respective compression volume $V_k$, as will be described in greater detail hereinafter.

If the piston of the piston cylinder unit 1 has an area $A_1$ on one side, which is exposed to the pressure $P_1$ of the working flow $Q_1$, and a different area $A_2$ on the other side of the piston, which is subject to the pressure $P_2$, the forces involved are indicated by the following equation (M = mass, $\ddot{s}$ = acceleration):

$$M\ddot{s} = P_1 \cdot A_1 - P_2 \cdot A_2 - F_R$$

wherein $F_R$ indicates frictional force.

If the frictional force $F_R$ and the counter-acting force $G = P_2 \cdot A_2$ are disregarded, what remains is the shortened force equation:

$$M\ddot{s} = P_1 \cdot A_1.$$

The pressures $P_1$ and $P_2$ are not constant in respect of time, thereby giving capacitive hydraulic flows $Q_{C1}$ and $Q_{C2}$, which vary in respect of time, in accordance with $Q_C = \dot{P} \cdot C$. The speed equation then reads as follows:

$$\dot{s} = \frac{Q_1}{A_1} = \frac{Q_{11} - Q_{C1}}{A_1} = \frac{Q_{11} - \dot{P}_1 \cdot C_1}{A_1}$$

If the supplied pressure changes from an initial value $P_{1a}$ to a final value $P_{1e}$, the compression volume is as follows:

$$V_k = (P_{1e} - P_{1a}) \cdot C_1$$

and a shortened force equation as follows:

$$M\ddot{s} = (P_{1e} - P_{1a}) \cdot A_1$$

When taking a speed $\dot{s}_R$ which rises with a ramp-like characteristic, during the ramp time $t_R$ and an initial value $Q_{1a}$ and a final value $Q_{1e}$ of the hydraulic fluid flow $Q_1$, the following equation applies in respect of acceleration:

$$\ddot{s}_R = \frac{\dot{s}_R}{t_R} = \frac{Q_{1a} - Q_{1e}}{A_1 \cdot t_R} = \frac{(P_{1e} - P_{1a}) \cdot A_1}{M}$$

From that, the compression volume can be calculated as follows:

$$V_k = \frac{(Q_{1e} - Q_{1a}) \cdot C_1 \cdot M}{A_1^2 \cdot t_R}$$

It may be considered that the compression volume $V_k$ is, so to speak, applied to or superimposed on the ramp at the beginning thereof, in other words, the arrangement uses a reference value voltage pulse $I_1$, the content of which corresponds to the compression volume $V_k$. Additional pulses $I_G$ and $I_R$ may be superimposed on the ramp, as indicated above, in order to take account of the counter-acting force G and the frictional force $F_R$. The magnitudes of the possibly additional pulses $I_G$ and $I_R$ are determined by empirical means.

The voltage pulse $-I_2$ at the end of the slope of the ramp corresponds, in regard to content, to the pulse $I_1$, as calculated. If the values M, $C_1$ and $A_1$ are assumed to be factors determined by the structure of the machine involved in a given situation of use, the contents of pulses $I_1$ and $-I_2$ depends only on the voltage difference and the ramp time $t_R$, i.e. in the slope of the ramp.

If therefore, in order to shorten the machine cycle time, the slope angle of the ramp is increased, a correspondingly larger pulse $I_1$ or $I_2$ must then be superimposed on the ramp.

When using a ramp configuration having a flat slope the voltage pulse to be superimposed thereon, in order to compensate for the compression volume $V_k$ inherent in the machine and its drive system, is to be a small voltage pulse which, in such a case, may optionally also be omitted. That is the situation which is shown on the right-hand side of the graph in FIG. 3, where there is no compensating pulse superimposed on the ramp voltage.

The invention can also be employed in relation to travel ramp characteristics, that is to say, ramp characteristics relating to distance. In such a case, the magnitude of the pulse $I_3$ at the beginning of the falling slope can be determined by similar considerations and factors, more specifically as:

$$I_3 = - \frac{Q_{1a} \cdot C_1 \cdot M \cdot K_S}{A_1^3} \cdot F_c$$

in which $K_S$ denotes the slope of the ramp characteristic U, $F_c$ is a dimensional conversion factor, and the other symbols are as indicated above. For reasons of concentrated representation however, the D-curve is shown in mirror image at the t-co-ordinate, in other words, the values of that curve are in actual fact negative. A positive pulse $I_4$ should in principle occur at the slope end of the ramp. As however, in regard to the characteristic shown in FIG. 3, the speed of movement of the mass M is to be reduced substantially to zero, for example as in the case of the die or mould closing movement in a die casting or injection moulding machine, a control pulse of the above-indicated kind and position is not superimposed on the illustrated reference value control voltage characteristic. If, in contrast, the speed of movement of the mass M to be displaced by the drive arrangement is to be reduced to a finite speed, then a positive control pulse $I_4$ is in fact employed and superimposed on the ramp characteristic at the slope end.

Referring now again to FIG. 2, it will be appreciated that the characterising values and parameters of the drive are illustrated therein, in the situation of starting a mass into motion from a rest condition. The mass to be driven actually begins to move only when a certain pressure P has been built up. Acceleration B then begins, reaches its maximum at about the middle of the ramp characteristic, and then falls back to zero again. The curve $Q_{11}$ in respect of the working flow of hydraulic fluid follows the control voltage U, with a certain delay thereafter, and without also performing the jumps or abrupt changes in the characteristic U, as can be seen from the dash-dotted line $Q_{11}$ in FIG. 2. The change in the working flow, as indicated by dash-dotted line in the lower part of FIG. 2, at D, provides a better reflection of the shock-like character of the drive forces, that is to say, the way in which the drive forces abruptly change, as can be seen from the positively directed spike or peak $D_1$, corresponding to the pulse $I_1$ superimposed on the ramp characteristic U, and the negatively directed peak $-D_2$, which substantially corresponds to the negative pulse $-I_2$ on the ramp voltage U. It must be considered surprising that a pulse characteristic of that nature substantially prevents oscillations of the system, while normally drive pulses provide stimulus to a condition of oscillation.

While the control voltage U shown in FIG. 2 is represented in the form of an analog function, it is also possible for the control voltage to be prepared and reproduced by needle pulses. The control voltage U may also be represented by digital coding. In all those cases, the valve arrangement 5 is controlled in the manner shown by the analog signal U in FIG. 2. Instead of having a single restricted passage way 20, the valve arrangement 5 shown in the system of FIG. 1 may have two restricted passage ways, in order to be able to influence for example both the feed flow of hydraulic fluid and the discharge flow of hydraulic fluid. Moreover, the hydraulic fluid flow to the motor 1 does not need to be controlled by means of a constant pressure drop, as other control modes can also be employed.

In any case, a positive, abrupt, temporary increase in flow rate, as indicated at $D_1$, is superimposed on the hydraulic flow at the beginning of the rising slope near the initial flow rate $Q_{1a}$, while a negative, abrupt, temporary decrease in flow rate as indicated by $-D_2$ is superimposed on the hydraulic flow at the end of the slope of the ramp near the final flow rate $Q_{1e}$. Those changes in flow rate, or a proportion thereof, are in relationship with the compression volume $V_k$ of the system. The increase $D_1$ in flow rate also reflects the existence of the pulses $I_G$ and $I_R$ which are additionally superimposed on the ramp The pulse $I_1$ and the compression volume $V_k$ therefore represent only a part of the total increase in flow rate $D_1$. The pulse $-I_3$ and the change in flow rate $-D_3$ correspond to each other. As the speed depicted in curve V in FIG. 3 tends towards zero as t increases, $I_4$ and therefore also $D_4$ also tend to zero.

It will be appreciated that the form of the control pulses $I_1$, $I_2$ and $I_3$ shown in FIGS. 2 and 3 is an idealised form; in reality, because of the inductive resistance of the control magnets to shift the spool of the valve arrangement 5, the control pulses are smoothed out. Added to that also is the inertia of such valve spool.

Such a low-pass performance on the part of the valve arrangement is a desirable factor. If the system uses a valve arrangement 5 which does not have a satisfactory low-pass performance (in that case, the control range or the control speed range of the valve would be excessively sensitive), then the system may include, between the signal generating means 6 and 8, and the valve arrangement 5, an element which has a low-pass mode of operation, for example an analog or a digital low-pass filter 25. In such an arrangement, the restricted passage way 20 transmits a hydraulic flow $Q_{11}$ which, although it has waves or cyclic fluctuations therein (see FIGS. 2 and 3), it does not have breaks therein, in the sense of an undesired fall in the hydraulic flow in respect of time, during a general rise in flow, as shown in FIG. 2. It will be seen therefore that the above-described system and mode of operation provide for an improvement in the dynamics of a hydrostatic or pneumatic drive arrangement, in order to reduce a machine cycle time, for example in regard to a die casting or injection moulding machine, and/or also to reduce the stress loadings on the machine and components thereof. The above-described system may also make it possible to save drive energy because it does not require additional damping components which also consume energy. When the system is used in connection with die casting and injection moulding machines for example, it is possible to operate with lower counter-pressures.

Figure 4:
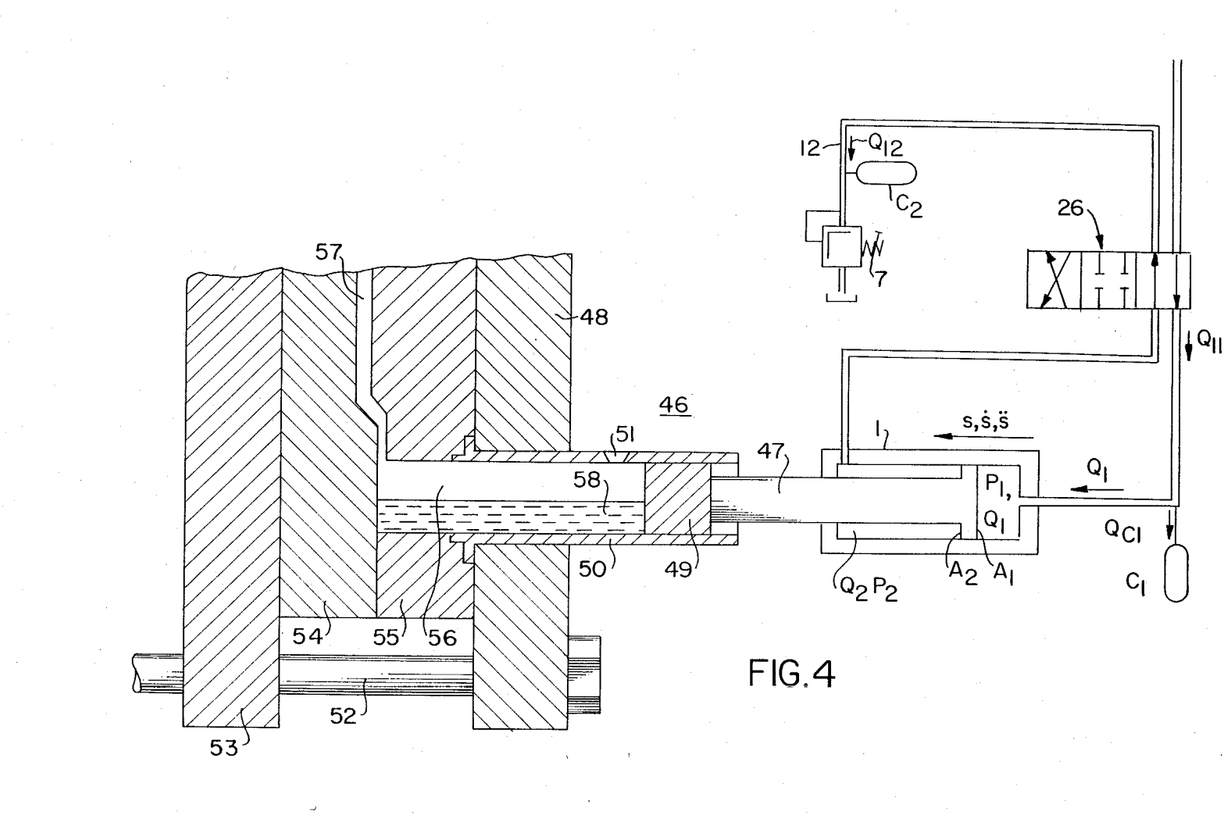
FIG. 4 is a partly diagrammatic view showing the drive and injection molding machine.

FIG. 4 shows the application of the drive device as described with FIGS. 1 to 3 in connection with a die casting and injection moulding machine 46 as described in French Pat. No. 2,299,103 which is incorporated by reference. The piston of the unit 1 is connected to the rod 47 of the piston 49 guided in cylinder 50, which has a filling in opening 51. The cylinder 50 is fixed in a fixing plate 48 which is connected through a guiding rod 52 to a movable plate 53. Between the plates 48 and 53, a movable half mould element 54 and a fix half mould element 55 are arranged encompassing a moulding cavity 57 which is connected through a passageway 56 to molten material 58 which has been filled in cylinder 50.

For operating the die casting and injection moulding machine 46, the mass formed by the piston and rod of unit 1 and piston 49, rod 47 and molten mass 58 of machine 46 are to be accelerated in a very short time, as already explained mainly in connection with FIG. 2. At the end of the stroke, the movable masses have to be decelerated which has been described in connection with FIG. 3.

Various other modifications and alterations may be made in the above-described method and apparatus, without thereby departing from the scope of the invention as claimed.

I claim:

1. A method of operating a pressure fluid drive device for accelerating and decelerating a mass, which drive device includes a pressure fluid source, a valve means and a pressure fluid actuated motor means, said valve means having a controllable flow opening for metering-in an increasing and decreasing fluid flow to said motor means, which is subject to a generally increasing or decreasing fluid pressure, whereby said fluid is compressed or decompressed, respectively, resulting in a compression or decompression volume which increases or decreases, respectively, the accelerating or decelerating rate of said mass relative to a condition without such compression or decompression, said metering-in for accelerating said mass including the following steps:
   (a) from a first initial flow value, said increasing fluid flow is abruptly and temporarily increased by a volume flow rate which corresponds at least to said compression volume;
   (b) after said temporary increased volume flow rate has been metered-in, said increasing fluid flow is metered-in, beginning with a level near to said first initial flow value and ending with a lever near a desired first final flow value;
   (c) when said increasing fluid flow approaches said first final flow value, said metered-in flow is abruptly and temporarily decreased by a volume rate which corresponds to said compression fluid, and thereafter said fluid is metered-in at said first final flow value; said metering-in for decelerating said mass including the following steps:
   (d) from a second initial flow value, said decreasing fluid flow is abruptly and temporarily decreased by a volume flow rate which corresponds to said decompression volume;
   (e) after said temporary decreased volume flow rate has been metered-in, said decreasing fluid flow is metered-in beginning with a level near to said second initial flow value and ending with a level near a desired second final flow value;
   (f) when said decreasing fluid flow approaches said second final flow value, said metered-in flow is abruptly and temporarily increased by a volume rate which corresponds at most to said decompression volume, if said second final flow value is not zero, and thereafter said fluid is metered-in at said second final flow value.

2. A method according to claim 1 wherein when said first initial flow value is zero, said abruptly and temporarily increased fluid flow comprises a volume flow rate which includes a proportional portion for taking account of a counteracting pressure and frictional force acting on said mass in addition to said volume flow rate which corresponds at least to said compression volume.

3. A method according to claim 1 wherein when said second final flow value is zero, said abruptly and temporarily increased fluid flow is made smaller than would correspond to said decompression volume.

4. A method of operating a pressure fluid drive device for accelerating a mass, which drive device includes a pressure fluid source, a valve means and a pressure fluid actuated motor means, said valve means having a controllable flow opening for metering-in an increasing fluid flow to said motor means, which is subject to a generally increasing fluid pressure, whereby said fluid is compressed resulting in a compression volume, which decreases the accelerating rate of said mass relative to a condition without such compression, said metering-in for accelerating said mass including the following steps:
   (a) from an initial flow value, said increasing fluid flow is abruptly and temporarily increased by a volume flow rate which corresponds at least to said compression volume;
   (b) after said temporary increased volume flow rate has been metered-in, said increasing fluid flow is metered-in, beginning with a level near to said initial flow value and ending with a level near a desired final flow value;
   (c) when said increasing fluid flow approaches said final flow value, said metered-in flow is abruptly and temporarily decreased by a volume rate which corresponds to said compression volume, and thereafter said fluid is metered-in at said final flow value.

5. A method according to claim 4 wherein when said initial flow value is zero, said abruptly and temporarily increased fluid flow comprises a volume flow rate which includes a proportional portion for taking account of a counteracting pressure and frictional force acting on that mass in addition to said volume flow rate which corresponds at least to said compression volume.

6. A method of operating a pressure fluid drive device for decelerating a mass, which drive device includes a pressure fluid source, a valve means and a pressure fluid actuated motor means, said valve means having a controllable flow opening for metering-in a decreasing fluid flow to said motor means, which is subject to a generally decreasing fluid pressure, whereby said fluid is decompressed resulting in a decompression volume which increases the decelerating rate of said mass relative to a condition without such decompression, said metering-in for decelerating said mass including the following steps:
   (a) from an initial flow value, said decreasing fluid flow is abruptly and temporarily decreased by a volume flow rate which corresponds to said decompression volume;
   (b) after said temporary decreased volume flow rate has been metered-in, said decreasing fluid flow is metered-in beginning with a level near to said initial flow value and ending with a level near a desired final flow value;
   (c) when said decreasing fluid flow approaches said final flow value, said metered-in flow is abruptly and temporarily increased by a volume rate which corresponds at most to said decompression volume, if said final flow value is not zero, and thereafter said fluid is metered-in at said final flow value.

7. A method according to claim 6 wherein when said final flow value is zero, said abruptly and temporarily increased fluid flow is made smaller than would correspond to said decompression volume.

8. A pressure fluid drive device for accelerating a mass, which drive device comprises;
   a pressure fluid source;
   a valve means;
   a reference value signal generator means, and
   motor means to be pressure fluid actuated,
   said valve means having electric control means for adjusting a controllable flow opening for metering-in an increasing fluid flow which is subject to a generally increasing fluid pressure, whereby said fluid is compressed resulting in a compression volume which decreases the accelerating rate of said mass relative to a condition without such compression,
   said reference value signal generator means being connected to said electric control means of said valve means and being operable to produce a ramp waveform having a positive control pulse superimposed thereon at the beginning of the rise in the ramp waveform and a negative control pulse superimposed thereon at the end of the rise in the ramp waveform, the magnitude of the positive and negative control pulses corresponding to said compression volume.

9. A drive device according to claim 8 wherein when said drive device is starting said mass moving from rest, said generator means being operable to superimpose at least one further pulse on said positive pulse at the beginning of said rise in the ramp waveform, thereby taking account of a counteracting pressure and frictional forces acting on said mass.

10. A drive according to claim 9 wherein said generator means includes a pulse generator for producing positive pulses, a pulse generator for producing negative pulses and a ramp generator for producing a ramp waveform having a slope, said pulse generators being externally adjustable with respect to pulse amplitude and duration, and said ramp generator being externally adjustable with respect to the slope of the ramp waveform.

11. A pressure fluid device for decelerating a mass, which drive device comprises:
   a pressure fluid source,
   a valve means,
   a reference value signal generator means, and
   a pressure fluid actuated motor means;
   said valve means having electric control means for adjusting a controllable flow opening for metering-in a decreasing fluid flow which is subject to a generally decreasing fluid pressure, whereby said fluid is decomposed resulting in a decompression volume which increases the decelerating rate of said mass relative to a condition without such decompression,
   said reference value signal generator means being connected to said electric control means of said valve means and being operable to produce a ramp waveform having a negative control pulse superimposed thereon at the beginning of the fall in the ramp waveform, and a positive control pulse superimposed thereon at the end of the fall in the ramp waveform, the magnitude of the negative and positive control pulses corresponding to said decompression volume.

12. A drive device according to claim 11 wherein when said drive device is stopping said mass to a rest, said generator means being operable to omit said positive control pulse.

13. A drive device according to claim 11 wherein said generator means includes a pulse generator for producing positive pulses, a pulse generator for producing negative pulses and a ramp generator for producing a ramp waveform having a slope, said pulse generators being externally adjustable with respect to pulse amplitude and duration, and said ramp generator being externally adjustable with respect to the slope of the ramp waveform.

14. A drive device according to claims 10 or 13 further including a microprocessor for controlling said pulse generators and said ramp generator, and means for supplying said microprocessor with values relating to fluid flow at the beginning and the end of the ramp waveform, to hydraulic capacitance of the drive device, to said mass to be driven, to motor values, and to ramp duration and slope.

15. A drive device according to claims 8 or 11 wherein said generator means is operable to produce said ramp waveform between time limits.

16. A drive according to claims 8 or 11 wherein said generator means is operable to produce said ramp waveform during a travel distance of said mass.

17. A drive device according to claims 8 or 11 including a low pass filter arranged between said reference value signal generator means and said valve means having said electric control means for adjusting said flow opening.

18. A drive according to claim 14 including a die casting machine associated with said drive to be driven thereby.

19. A drive according to claim 14 including an injection moulding machine associated with said drive to be driven thereby.

* * * * *